Aug. 4, 1931.  G. S. MORISON  1,817,160
SELF TIGHTENING BEARING
Filed Aug. 25, 1928
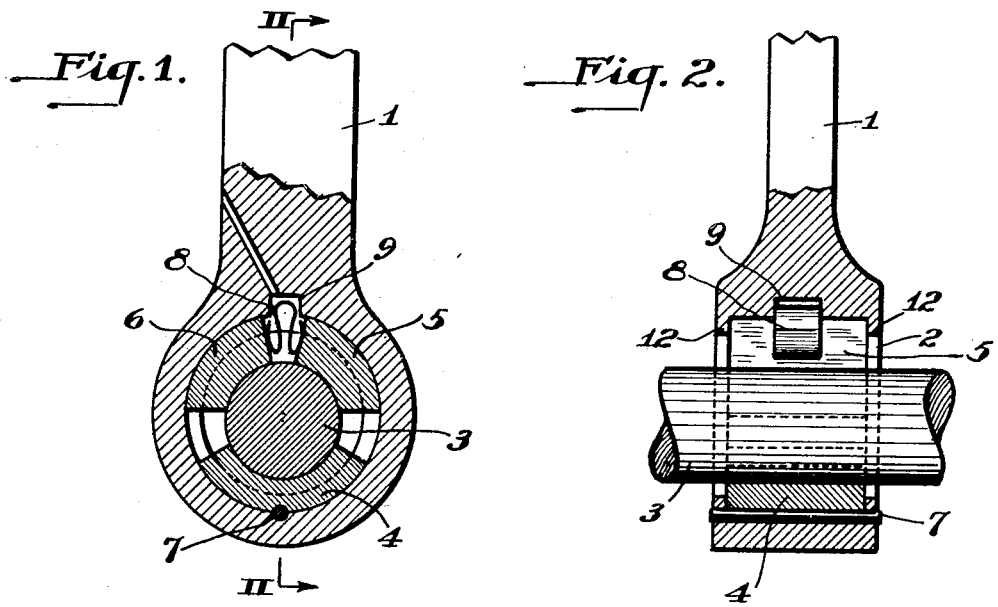
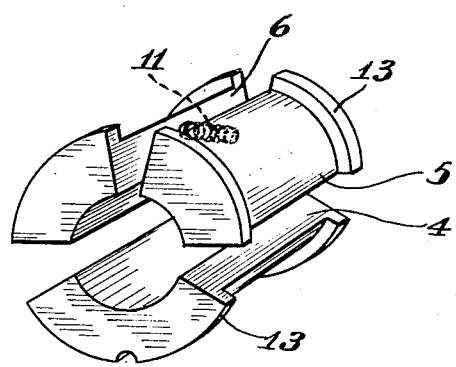
INVENTOR
George S. Morison
by Brown & Critchlow
his attorneys Patented Aug. 4, 1931

1,817,160

UNITED STATES PATENT OFFICE

GEORGE SMITH MORISON, OF PITTSBURGH, PENNSYLVANIA, ASSIGNOR TO MORISON INCORPORATED, OF PITTSBURGH, PENNSYLVANIA, A CORPORATION OF DELAWARE

SELF TIGHTENING BEARING

Application filed August 25, 1928. Serial No. 302,111.

This invention relates to self fitting bearings for use with rotating shafts and the like in which the play occasioned by the wearing away of the bearing surfaces is automatically taken up in the bearing.

The object of the invention generally stated is to provide a bearing for rotating shafts and the like in which provision is made for automatically maintaining a constant fit between the wearing surfaces of the bearing and the shaft journaled therein.

Other objects of the invention will become apparent when the following detailed description is read in conjunction with the accompanying drawings, in which Fig. 1 is an end view partly in section of a bearing embodying the preferred form of the invention; Fig. 2 a sectional view taken on the line II—II of Fig. 1; Fig. 3 a perspective view of a modification of the bearing in which a helical spring is employed to bias the wedge shaped members of the bushing into engagement with the shaft which they encircle.

The bearing provided according to this invention comprises a bearing housing such as provided in a connecting rod or movable member of that character having an opening in its end for receiving a shaft, pin, or the like. Disposed inside of this opening and encircling the shaft in spaced relation thereabout are positioned a plurality of bushing parts the outer peripheries of which conform to the shape of the opening. The inner circular surfaces of the bushing parts are so formed that they are eccentric to the outer periphery of the bushing as well as the opening in the connecting rod. The preferred embodiment of the invention consists in the employment of a bushing divided into three parts, two of which take the shape of annular wedges and are adapted to move about the shaft which they encircle. The other part, preferably the section of the bushing which is the thinnest, is secured in fixed relation with the walls of the opening in the connecting rod. The wedge-shaped parts are angularly spaced about the shaft upon which they are mounted and are biased into constant engagement therewith by means of a resilient element such as a leaf spring or helical spring, placed between them in such a way as to constantly urge them to take up the play between the shaft and the bushing as the surfaces wear away.

Referring now to the drawings, a connecting rod 1 is shown, having an annular shaft receiving opening 2 formed in its end which constitutes a bearing housing and in which a shaft, crank, or pin 3 is disposed. Interposed between shaft 3 and the annular opening 2 is a multiple part bushing or bearing consisting preferably of three parts 4, 5 and 6, the outer surfaces of which conform to the inner periphery of opening 2, and the inner surfaces of which conform to the outer periphery of shaft 3, but are eccentric to opening 2. Section 4, which is the thinnest section of the bushing, is so formed as to provide a seat for shaft 3, and is keyed in the wall of opening 2 by means of a key 7 which maintains section 4 directly in the lower center of the opening. Hence as the bushing wears away the axis of shaft 3 will be maintained in a plane passing through the longitudinal axis of shaft 3 and the axis of the connecting rod itself, thereby preventing the axis of the shaft from becoming eccentric to the center thrust line of the connecting rod.

The two parts 5 and 6 of the bushing, which because of the eccentricity of the inner surface of the bushing take the form of annular wedges, are spaced in angular relation around shaft 3, whereby they may be caused to constantly engage the shaft as the bearing surfaces wear away. To automatically and constantly bias these members towards their shaft engaging positions, a resilient member, such as a leaf spring 8, may be positioned between them in the space at the top of the bearing. A slot 9 may be cut in opening 2 and spring 8 fitted into it so that the spring will also function as a stop for limiting the movement of the wedge-shaped bearing sections around the shaft. Different forms of springs may be employed for biasing the wedge-shaped member of the bushing constantly into engagement with the shaft that they encircle, and in Fig. 3 a helical spring 11 is shown for this purpose. Where springs differing in shape from spring 8 are employed between parts 5 and 6 a key (not shown) may replace spring 8 in slot 9 for limiting their movement about the shaft.

While a connecting rod and reciprocally driven shaft are shown, it will be understood that the end of the rod constitutes a bearing housing, and that the invention is usable for a stationary bearing having a shaft with rotary motion only.

In the bearing shown in Figs. 1 and 2, annular flanges 12 are provided at opposite ends of opening 2 for holding the bushing parts in place. However, the bushing parts may be held in place by means of annular flanges 13 formed thereon, as shown in Fig. 3, in which case the opening 2 would be made perfectly smooth.

In order that the bushing parts may adjust themselves for considerable wearing away of the bearing surfaces, adequate spacing should be allowed between parts 4 and 5, and parts 4 and 6. These spacings not only permit the bushing parts to be adjusted but also provide an opening through which oil may flow to lubricate the bearing. Where the bearings are lubricated by the splash method, as is common in automobile engine construction, this is an especially advantageous feature. In some applications of a bearing of this character it may be desirable to have the center of the shaft displaced in a direction other than in alignment with the center of the connecting rod as the bearing surfaces wear away, and to determine the direction in which it will be displaced the seating section 4 of the bushing may be keyed to the connecting rod opening in any selected position so that the wedge shaped members will urge the center of the shaft in the desired direction.

According to the provisions of the patent statutes, I have explained the principle and operation of my invention and have illustrated and described what I now consider to represent its best embodiment. However, I desire to have it understood that, within the scope of the appended claims, the invention may be practiced otherwise than as specifically illustrated and described.

I claim:

1. A bearing comprising a circular housing having a shaft receiving opening, a shaft disposed in said housing and a three part bushing of cylindrical outer contour fitted in the housing in spaced relation around said shaft, the outer periphery of said bushing conforming to said shaft receiving opening, the shaft engaging surface of the bushing parts being eccentric to their outer periphery two of said bushing parts forming annular wedges and said wedges being adapted to move into a constant shaft engaging position as the bearing surface wears away.

2. A bearing comprising a bearing housing having a shaft receiving opening, a shaft disposed in said opening, a three part bushing disposed in said opening in angular spaced relation about said shaft, the outer periphery of said bushing parts conforming to the opening in the housing, the inner shaft engaging surface being eccentric to their outer periphery, two of said bushing parts forming annular wedges, said wedges being adapted to adjust themselves to constantly engage said shaft as the bearing surfaces wear away, and means for constantly biasing said wedges into engagement with said shaft.

3. A bearing comprising a bearing housing having a shaft receiving opening, a shaft disposed in said opening, a three part bushing disposed in said opening in angular spaced relation about said shaft, the outer periphery of said bushing parts conforming to the shape of said opening, their inner shaft engaging surface being eccentric to their outer periphery, two of said bushing parts forming annular wedges, said wedges being adapted to adjust themselves to constantly engage said shaft as the wearing surfaces wear away, means for biasing said wedges into said shaft engaging positions, and means for maintaining said other bushing part in fixed position in said shaft receiving opening.

4. A connecting rod bearing comprising a connecting rod having a shaft receiving opening, a shaft disposed in said opening, a three part bushing disposed in said opening in angular spaced relation about said shaft, the outer periphery of said bushing parts conforming to the opening in the connecting rod their inner shaft engaging surface being eccentric to their outer periphery, two of said bushing parts forming annular wedges which are adapted to adjust themselves to constantly engage said shaft as the surfaces wear away, means for biasing said wedges into engagement with said shaft, and means for securing said other bushing part in fixed position in said connecting rod opening, said last mentioned bushing part being adapted to maintain the center of said shaft in a plane passing through the longitudinal center of the shaft and the longitudinal center of the connecting rod.

5. A bearing comprising a bearing housing having a shaft receiving opening, a shaft disposed in said opening, a three part bushing disposed in said opening in angular spaced relation about said shaft, the outer periphery of said bushing parts conforming to the opening in the housing, the inner shaft engaging surface being eccentric to their outer periphery, two of said bushing parts forming annular wedges, said wedges being adapted to adjust themselves to constantly engage said shaft as the bearing surfaces wear away, and means for limiting the movement of the wedges about the shaft.

In testimony whereof, I sign my name.

GEORGE SMITH MORISON.